(12) United States Patent
Lucas et al.

(10) Patent No.: US 8,214,580 B2
(45) Date of Patent: Jul. 3, 2012

(54) SOLID STATE DRIVE WITH ADJUSTABLE DRIVE LIFE AND CAPACITY

(75) Inventors: Gregg S. Lucas, Tucson, AZ (US); Gary A. Tressler, Poughkeepsie, NY (US); Dustin J. Vanstee, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 312 days.

(21) Appl. No.: 12/604,616

(22) Filed: Oct. 23, 2009

(65) Prior Publication Data

US 2011/0099320 A1 Apr. 28, 2011

(51) Int. Cl.
*G06F 12/00* (2006.01)
(52) U.S. Cl. .................. 711/103; 711/114; 711/170
(58) Field of Classification Search .................. None
See application file for complete search history.

(56) References Cited

U.S. PATENT DOCUMENTS

| | | | |
|---|---|---|---|
| 5,321,697 A | 6/1994 | Fromm et al. | |
| 5,835,694 A | 11/1998 | Hodges | |
| 5,889,795 A | 3/1999 | Niijima et al. | |
| 6,507,890 B1 | 1/2003 | Morley et al. | |
| 6,567,889 B1 | 5/2003 | DeKoning et al. | |
| 7,136,966 B2 | 11/2006 | Hetrick | |
| 7,149,846 B2 | 12/2006 | Hetrick | |
| 7,506,187 B2 | 3/2009 | Maddock | |
| 2003/0056141 A1 | 3/2003 | Lai et al. | |
| 2005/0044454 A1* | 2/2005 | Moshayedi | 714/54 |
| 2008/0126682 A1 | 5/2008 | Zhao et al. | |

FOREIGN PATENT DOCUMENTS

WO 2007137013 A2 11/2007

OTHER PUBLICATIONS

Anonymous. Method for fault tolerance in nonvolatile storage, IPCOMM, Feb. 3, 2005, IPCOMM000042268D, IPCOMM Prior Art Database.

* cited by examiner

*Primary Examiner* — Shawn X Gu
(74) *Attorney, Agent, or Firm* — Cantor Colburn LLP; William A. Kinnaman, Jr.

(57) ABSTRACT

A method for adjusting a drive life and a capacity of a solid state drive (SSD), the SSD comprising a plurality of memory devices includes determining a desired drive life for the SSD; determining a utilization for the SSD; and allocating a portion of the plurality of memory devices as available memory and a portion of the plurality of memory devices as spare memory based on the desired drive life and the utilization. An SSD with an adjustable drive life and capacity includes a plurality of memory devices; and a memory allocation module configured to: determine a desired drive life for the SSD; determine a utilization for the SSD; and allocate a portion of the plurality of memory devices as available memory and a portion of the plurality of memory devices as spare memory based on the desired drive life and the utilization.

17 Claims, 4 Drawing Sheets

200

DETERMINE DESIRED DRIVE LIFE FOR SSD
201

DETERMINE MINIMUM CAPACITY AND PARTITIONS OF SSD
202

MONITOR SSD TO DETERMINE UTILIZATION SET POINT
203

ALLOCATE AVAILABLE AND OVERPROVISIONED MEMORY BASED ON DESIRED DRIVE LIFE, MINIMUM CAPACITY, AND INITIAL UTILIZATION
204

MONITOR SSD TO UPDATE UTILIZATION, AND ADJUST ALLOCATED AVAILABLE AND OVERPROVISIONED MEMORY BASED ON UPDATED UTILIZATION
205

IF A PORTION OF AVAILABLE MEMORY FAILS, REPLACE FAILED MEMORY WITH OVERPROVISIONED MEMORY
206

FIG. 2

SOLID STATE DRIVE WITH ADJUSTABLE DRIVE LIFE AND CAPACITY

BACKGROUND

This disclosure relates generally to the field of solid state drives (SSDs).

SSDs are increasingly being used in computing systems instead of hard disk drives (HDDs), due to improved performance and decreased mechanical reliability issues. An SSD comprises a controller chip connected via a high speed interface to the computing system. Storage elements are connected to a controller chip via a device interface. The controller chip translates the high speed interface protocol into the protocol required by the storage elements. The storage elements may comprise flash devices, and the device interface may comprise a flash interface and buses. Over time, flash devices and buses may stop working due to overuse or prolonged exposure to high voltages. Contacts connecting the controller to the flash devices may also corrode and wear out over time. The drive life of the SSD is directly related to the usage of the SSD, because each of the flash devices that comprise the SSD supports only a limited number of program/erase (PE) cycles.

SUMMARY

An exemplary embodiment of a method for adjusting a drive life and a capacity of a solid state drive (SSD), the SSD comprising a plurality of memory devices includes determining a desired drive life for the SSD; determining a utilization for the SSD; and allocating a portion of the plurality of memory devices as available memory and a portion of the plurality of memory devices as spare memory based on the desired drive life and the utilization.

An exemplary embodiment of an SSD with an adjustable drive life and capacity includes a plurality of memory devices; and a memory allocation module configured to: determine a desired drive life for the SSD; determine a utilization for the SSD; and allocate a portion of the plurality of memory devices as available memory and a portion of the plurality of memory devices as spare memory based on the desired drive life and the utilization.

An exemplary embodiment of a computer program product comprising a computer readable storage medium containing computer code that, when executed by a computer, implements a method for adjusting the drive life and capacity of a solid state drive (SSD), the SSD comprising a plurality of memory devices, wherein the method includes determining a desired drive life for the SSD; determining a utilization for the SSD; and allocating a portion of the plurality of memory devices as available memory and a portion of the plurality of memory devices as spare memory based on the desired drive life and the utilization.

Additional features are realized through the techniques of the present exemplary embodiment. Other embodiments are described in detail herein and are considered a part of what is claimed. For a better understanding of the features of the exemplary embodiment, refer to the description and to the drawings.

BRIEF DESCRIPTION OF THE SEVERAL VIEWS OF THE DRAWINGS

Referring now to the drawings wherein like elements are numbered alike in the several FIGURES:

FIG. 2 illustrates a method for an SSD with adjustable drive life and capacity.

DETAILED DESCRIPTION

Embodiments of systems and methods for an adjustable drive life and capacity SSD are provided, with exemplary embodiments being discussed below in detail.

Some SSD usages, such as a database application comprising static data in a database, may perform a relatively low number of PE cycles per unit of time, while other SSD usages, such as enterprise applications using hot data, may perform a higher number of PE cycles per unit of time. An SSD used in conjunction with a high frequency PE application wears out faster than an SSD used for a low frequency PE application. An SSD has a fixed amount of physical flash storage space. The amount of spare memory available to be used as backup in case of memory device failure, and the SSD utilization (i.e., the average frequency of PE cycles), determine the drive life of the SSD. An SSD used in conjunction with a low frequency PE application may be configured to allocate a larger portion of the physical storage space of the SSD as available memory, with a smaller amount of remaining memory being reserved for spare, or overprovisioning; a high frequency PE application may allocate a smaller portion of the physical storage as available memory, reserving a larger portion of the SSD memory for spare.

A user may configure a desired drive life for the SSD. The user may also configure a minimum storage capacity (i.e., minimum amount of available storage) for the SSD. These values may be configured in the firmware of the SSD. The utilization of the SSD may be determined by dynamically detecting the PE cycle frequency of the SSD over a set period of time. Based on the user configuration and the utilization, a portion of the SSD memory devices is allocated as available memory, and another portion of the SSD memory devices is reserved as overprovisioned memory, to be used as fallback when available memory devices reach their PE wear out threshold. The amount of available memory may be greater than or equal to the configured minimum storage capacity. The proportion of available memory to overprovisioned memory may be adjusted if the utilization changes; as the SSD utilization changes, the controller may allocate or deallocate available memory to meet the SSD drive life configuration. The SSD drive life is therefore predictable and adjustable.

Figure 1:
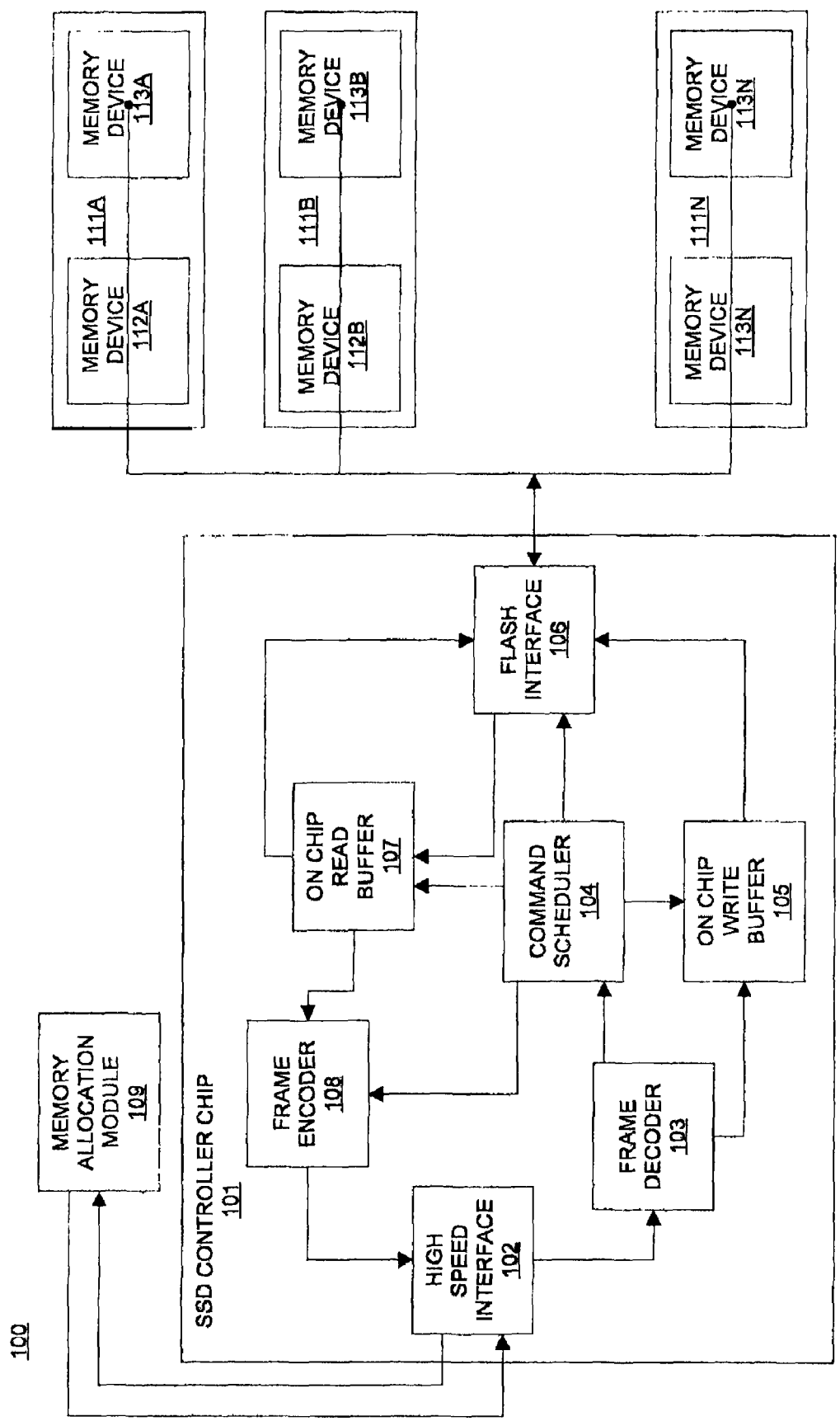
FIG. 1 illustrates an embodiment of an SSD with adjustable drive life and capacity.

FIG. 1 illustrates an embodiment of an SSD 100. SSD 100 comprises SSD controller chip 101 and memory device sites 111A-111N. SSD controller chip 101 communicates with a computing system (not shown) via high speed interface 102, which may comprise Serial Advanced Technology Attachment (SATA), Fibre Channel (FC), Peripheral Component Interconnect Express (PCIe), Serial Attached Small Computer System Interface (SAS), or any other appropriate type of transmit and receive ports. Data to be written into the SSD memory is received on high speed interface 102, and is sent to on-chip write buffer 105 via frame decoder 103. On-chip write buffer 105 performs error checking and correction (ECC) code generation for the write data, and then the write data and ECC code is written into the appropriate memory device via flash interface 106. For SSD read operations, data is read out of the appropriate memory device via flash interface 106, and the read out data is sent to on-chip read buffer 107, which buffers the data and performs ECC functions for the read out data, then sends the data to high speed interface 102 via frame encoder 108. Command scheduler 104 receives commands from the computing system (not shown) via frame decoder 103, and controls on-chip write buffer 105, flash interface 106, on-chip read buffer 107, and frame encoder 108. Memory device sites 111A-111N comprise flash memory devices 112A and 113A, 112B and 113B, and 112N and 113N, respectively. Memory device sites 111A-111N are shown for illustrative purposes only; an SSD 100 may comprise any appropriate number of memory device sites, and the memory device sites may comprise any appropriate number of flash memory devices. Memory allocation module 109 communicates with SSD 100 via high speed interface 102 to allocate a portion of memory devices 111A-111N as available memory, and allocate a portion of memory devices 111N-111A as overprovisioned memory, based on a configured desired drive life of the SSD and/or a configured minimum capacity. Memory allocation module 109 also determines a utilization of the SSD.

Overprovisioning management is not restricted to a single physical drive; a single drive may be broken into partitions, with each partition having a raw amount of space that the OS may specify in terms of available memory and overprovisioned memory. The total amount of available and overprovisioned memory may not exceed the total raw capacity of the SSD 100. For an example SSD having a total raw capacity of 100 GB, the SSD may comprise a first partition (Partition 0) having a raw capacity of 50 GB, with 40 GB available space and 10 GB overprovisioning space, a second partition (Partition 1) having a raw capacity of 30 GB, with 20 GB available space and 10 GB overprovisioning space, and a third partition (Partition 2) having a raw capacity of 20 GB, with 15 GB available space and 5 GB overprovisioning space.

The amount of overprovisioning may be determined from a lookup table based on the utilization. Table 1 illustrates an embodiment of a utilization to overprovisioning lookup table. In the embodiment of Table 1, utilization is measured in MB/s (Mega Bytes/second), but utilization may also be measured with other appropriate metrics, such as page operations/second, or IOPS (Input/Output Operations/second).

TABLE 1

| Utilization Range | % Overprovision |
|---|---|
| 100%-91% | 75% |
| 90%-81% | 65% |
| ... | |
| ... | |
| 5%-0% | 5% |

The current overprovisioning/utilization value may be tracked for each partition and compared to a previous determined utilization for the partition. If the current utilization is greater than the previous utilization, then based on the lookup table, the drive may increase the overprovisioning of the drive to increase the overall life of the drive. If the current utilization is less than the previous utilization, the overprovisioning may be decreased.

FIG. 2 illustrates an embodiment of a method implemented by a memory allocation module 109 for an adjustable drive life and capacity SSD 100. The method of FIG. 2 may be performed for an entire SSD memory, or for a single partition of an SSD. In block 201, a desired drive life for the memory is determined. The configuration of the desired drive life may be performed by a user in any appropriate manner, such as in the SSD firmware. In block 202, a minimum storage capacity for the memory is determined; the minimum storage capacity may also be configured by a user. In block 203, a utilization set point reflecting an average PE cycle frequency during normal operation of the SSD is determined. In block 204, a portion of the memory is allocated as available memory, and a portion of the memory is allocated as overprovisioned memory. Any appropriate proportions of the total memory may be allocated as available and overprovisioned memory; the allocation is based on the determined utilization set point and the configured drive life. The allocation may be based on a lookup table such as is shown in Table 1. The amount of available memory may be higher than the determined minimum capacity from block 202. In block 205, memory operations are monitored and current utilization is determined, and the available and overprovisioned memory allocation may be adjusted based on the current utilization; this is discussed in further detail below with regards to FIG. 3. In block 206, in the event a portion of the available SSD memory fails, the failed portion of the available SSD memory is replaced with a portion of the overprovisioned memory. The data in the failed portion of the memory may be reconstructed using ECC data.

Figure 3:
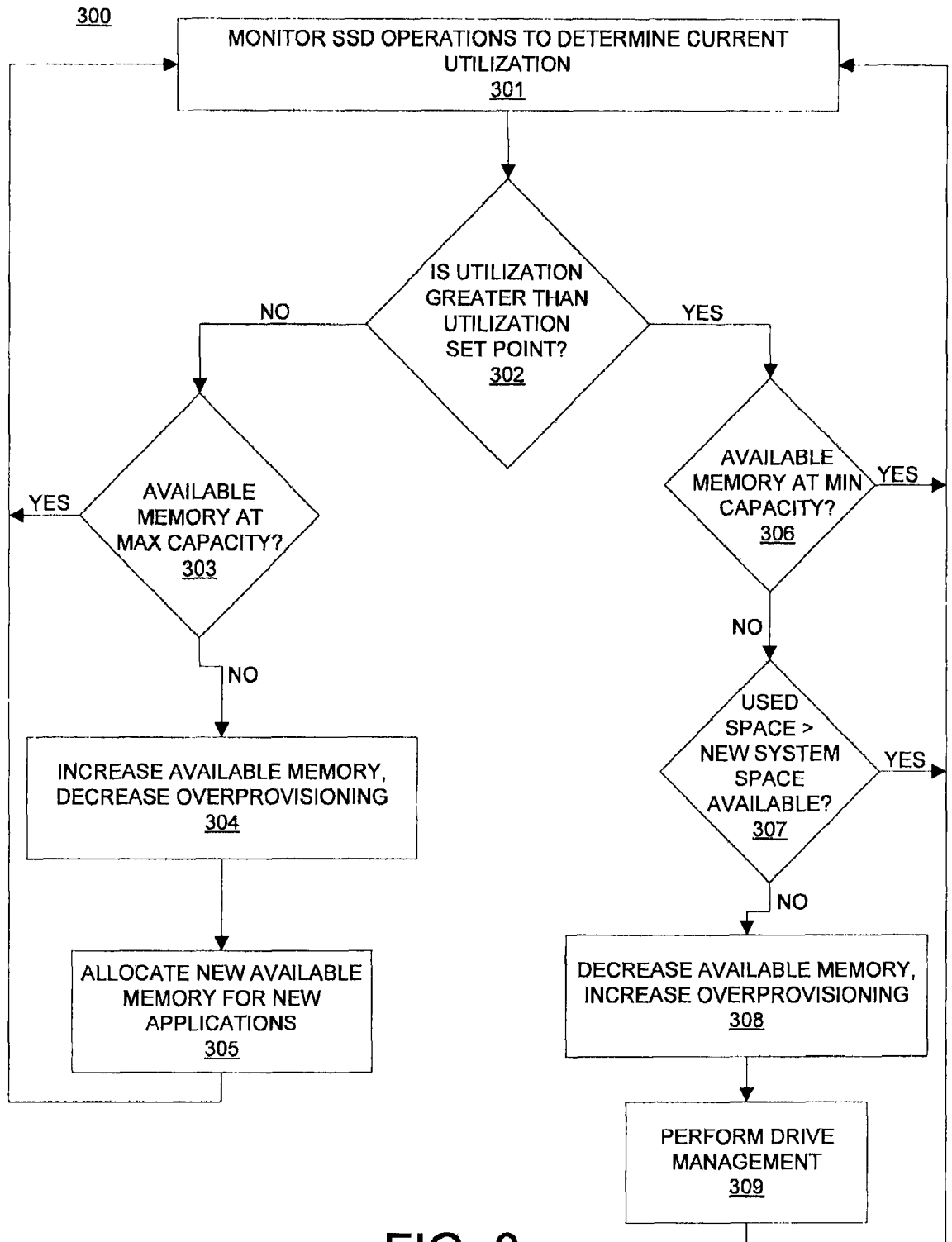
FIG. 3 illustrates an embodiment of a method for adjusting a memory allocation for an SSD with adjustable drive life and capacity.

FIG. 3 illustrates an embodiment of a method for adjusting a memory allocation for an SSD with adjustable drive life and capacity. In block 301, memory operations are monitored to determine a current utilization. In block 302, it is determined whether the current utilization is greater than the utilization set point determined in block 203. The utilization may be compared to the utilization set point periodically at a set frequency; the frequency may be configured in chip firmware or system software in various embodiments. If the current utilization is determined to be less than the utilization set point, in block 303, it is determined if the available memory is at a maximum capacity of the memory. If the available memory is at the maximum capacity, flow returns to block 301. If the available memory is less than the maximum capacity, the amount of available memory is increased and the amount of overprovisioned memory is decreased, in block 304. The allocation may be based on a lookup table such as is shown in Table 1. In block 305, the newly available memory may be allocated for new applications, and flow returns to block 301, with the utilization set point updated to reflect the current utilization. If the current utilization is determined to be greater than the utilization set point in block 302, it is determined in block 306 whether the available memory is at the minimum capacity configured in block 202. If the available memory is at the minimum capacity, flow returns to block 301. If the available memory is greater than the minimum capacity, then in block 307, it is determined whether the available memory is greater than an amount of new system space available. If the available memory is greater than the amount of new system space available, flow returns to block 301. If the used memory is determined to be less than an amount of new system space available in block 307, the available memory is decreased, and overprovisioned memory is increased in block 308. The allocation may be based on a lookup table such as is shown in Table 1. In block 309, drive management is performed on the newly overprovisioned memory, and flow returns to block 301, with the utilization set point updated to reflect the current utilization.

With reference to FIG. 1, in some embodiments, memory allocation module 109 may be part of the operating system (OS) of the computing system (not shown), and may control the drive capacity and overprovisioning settings via the SSD high speed interface 102, or via a secondary link over a debug port (not shown). In other embodiments, memory allocation module 109 may be located in SSD controller chip 101. This requires a communication mechanism between the SSD and the OS to dynamically change the amount of storage available to the system. However, the SSD controller 101 may not be able to determine which storage is allocated and which is not allocated. In such an embodiment, memory allocator 109 may only be permitted to perform an increase in available storage, and not perform a decrease system storage. By default, the SDD may initially allocate the minimum available storage and only increase the storage capacity if the drive over a long period of time displayed a low utilization rate.

Figure 4:
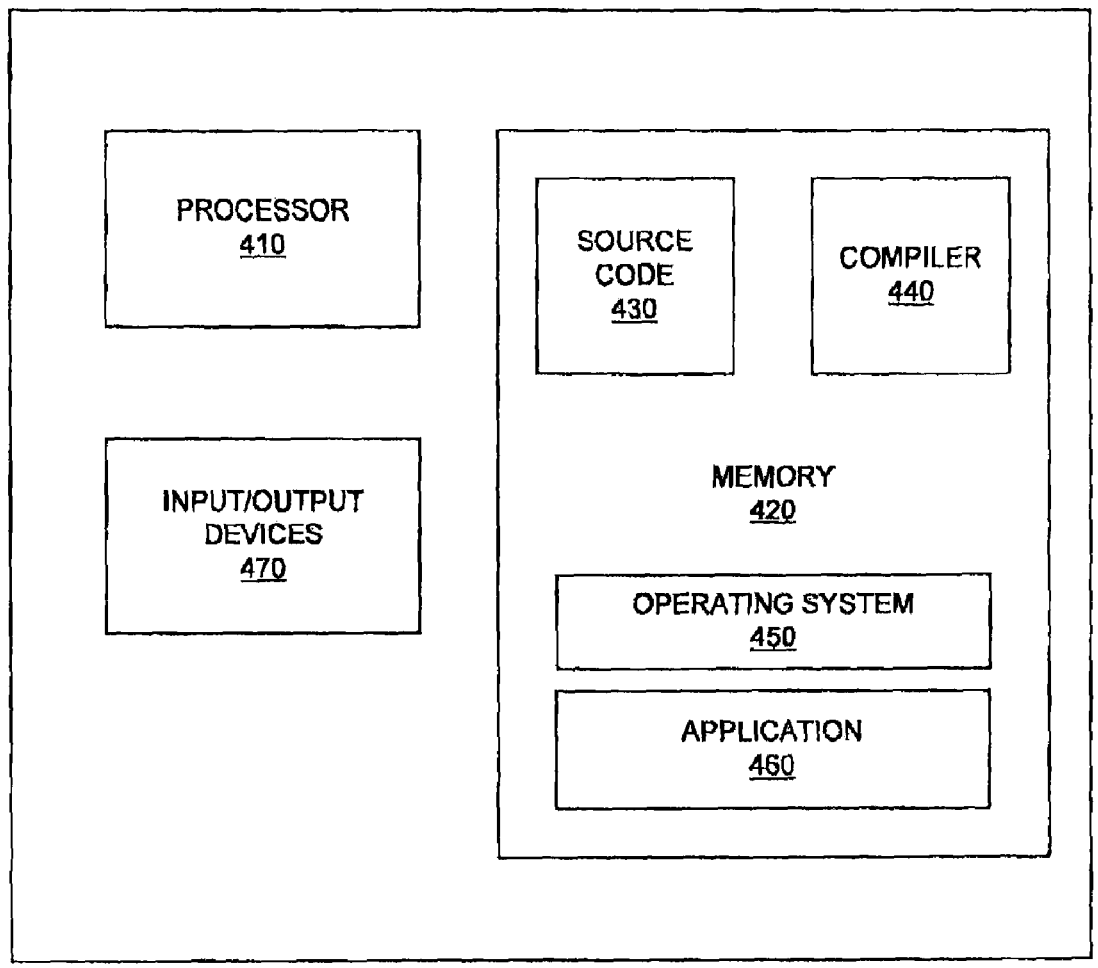
FIG. 4 illustrates an embodiment of a computer that may be used in conjunction with an SSD with adjustable drive life and capacity.

FIG. 4 illustrates an example of a computer 400 having capabilities, which may be utilized by exemplary embodiments of systems and methods for an SSD with adjustable drive life and capacity as embodied in software. Various operations discussed above may utilize the capabilities of the computer 400. One or more of the capabilities of the computer 400 may be incorporated in any element, module, application, and/or component discussed herein.

The computer 400 includes, but is not limited to, PCs, workstations, laptops, PDAs, palm devices, servers, storages, and the like. Generally, in terms of hardware architecture, the computer 400 may include one or more processors 410, memory 420, and one or more input and/or output (I/O) devices 470 that are communicatively coupled via a local interface (not shown). The local interface can be, for example but not limited to, one or more buses or other wired or wireless connections, as is known in the art. The local interface may have additional elements, such as controllers, buffers (caches), drivers, repeaters, and receivers, to enable communications. Further, the local interface may include address, control, and/or data connections to enable appropriate communications among the aforementioned components.

The processor 410 is a hardware device for executing software that can be stored in the memory 420. The processor 410 can be virtually any custom made or commercially available processor, a central processing unit (CPU), a digital signal processor (DSP), or an auxiliary processor among several processors associated with the computer 400, and the processor 410 may be a semiconductor based microprocessor (in the form of a microchip) or a macroprocessor.

The memory 420 can include any one or combination of volatile memory elements (e.g., random access memory (RAM), such as dynamic random access memory (DRAM), static random access memory (SRAM), etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 420 may incorporate electronic, magnetic, optical, and/or other types of storage media. Note that the memory 420 can have a distributed architecture, where various components are situated remote from one another, but can be accessed by the processor 410.

The software in the memory 420 may include one or more separate programs, each of which comprises an ordered listing of executable instructions for implementing logical functions. The software in the memory 420 includes a suitable operating system (O/S) 450, compiler 440, source code 430, and one or more applications 460 in accordance with exemplary embodiments. As illustrated, the application 460 comprises numerous functional components for implementing the features and operations of the exemplary embodiments. The application 460 of the computer 400 may represent various applications, computational units, logic, functional units, processes, operations, virtual entities, and/or modules in accordance with exemplary embodiments, but the application 460 is not meant to be a limitation.

The operating system 450 controls the execution of other computer programs, and provides scheduling, input-output control, file and data management, memory management, and communication control and related services. It is contemplated by the inventors that the application 460 for implementing exemplary embodiments may be applicable on all commercially available operating systems.

Application 460 may be a source program, executable program (object code), script, or any other entity comprising a set of instructions to be performed. When a source program, then the program is usually translated via a compiler (such as the compiler 440), assembler, interpreter, or the like, which may or may not be included within the memory 420, so as to operate properly in connection with the O/S 450. Furthermore, the application 460 can be written as (a) an object oriented programming language, which has classes of data and methods, or (b) a procedure programming language, which has routines, subroutines, and/or functions, for example but not limited to, C, C++, C#, Pascal, BASIC, API calls, HTML, XHTML, XML, ASP scripts, FORTRAN, COBOL, Perl, Java, ADA, .NET, and the like.

The I/O devices 470 may include input devices such as, for example but not limited to, a mouse, keyboard, scanner, microphone, camera, etc. Furthermore, the I/O devices 470 may also include output devices, for example but not limited to a printer, display, etc. Finally, the I/O devices 470 may further include devices that communicate both inputs and outputs, for instance but not limited to, a NIC or modulator/demodulator (for accessing remote devices, other files, devices, systems, or a network), a radio frequency (RF) or other transceiver, a telephonic interface, a bridge, a router, etc. The I/O devices 470 also include components for communicating over various networks, such as the Internet or intranet.

If the computer 400 is a PC, workstation, intelligent device or the like, the software in the memory 420 may further include a basic input output system (BIOS) (omitted for simplicity). The BIOS is a set of essential software routines that initialize and test hardware at startup, start the O/S 450, and support the transfer of data among the hardware devices. The BIOS is stored in some type of read-only-memory, such as ROM, PROM, EPROM, EEPROM or the like, so that the BIOS can be executed when the computer 400 is activated.

When the computer 400 is in operation, the processor 410 is configured to execute software stored within the memory 420, to communicate data to and from the memory 420, and to generally control operations of the computer 400 pursuant to the software. The application 460 and the O/S 450 are read, in whole or in part, by the processor 410, perhaps buffered within the processor 410, and then executed.

When the application 460 is implemented in software it should be noted that the application 460 can be stored on virtually any computer readable medium for use by or in connection with any computer related system or method. In the context of this document, a computer readable medium may be an electronic, magnetic, optical, or other physical device or means that can contain or store a computer program for use by or in connection with a computer related system or method.

The application 460 can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium.

More specific examples (a nonexhaustive list) of the computer-readable medium may include the following: an electrical connection (electronic) having one or more wires, a portable computer diskette (magnetic or optical), a random access memory (RAM) (electronic), a read-only memory (ROM) (electronic), an erasable programmable read-only memory (EPROM, EEPROM, or Flash memory) (electronic), an optical fiber (optical), and a portable compact disc memory (CDROM, CD R/W) (optical). Note that the computer-readable medium could even be paper or another suitable medium, upon which the program is printed or punched, as the program can be electronically captured, via for instance optical scanning of the paper or other medium, then compiled, interpreted or otherwise processed in a suitable manner if necessary, and then stored in a computer memory.

In exemplary embodiments, where the application 460 is implemented in hardware, the application 460 can be implemented with any one or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

The technical effects and benefits of exemplary embodiments include an SSD with configurable, predictable drive life.

The terminology used herein is for the purpose of describing particular embodiments only and is not intended to be limiting of the invention. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention claimed is:

1. A method for adjusting a drive life and a capacity of a solid state drive (SSD), the SSD comprising a plurality of memory devices, the method comprising:
   determining a desired drive life for the SSD;
   determining a utilization for the SSD, wherein the utilization comprises an average frequency of program/erase (PE) cycles; and
   allocating a portion of the plurality of memory devices as available memory and a portion of the plurality of memory devices as spare memory based on the desired drive life and the utilization.

2. The method of claim 1, wherein the desired drive life is configured by a user.

3. The method of claim 1, wherein the portion of the plurality of memory devices of the SSD allocated as available memory is greater than or equal to a minimum storage capacity of the SSD, the minimum storage capacity being configured by a user.

4. The method of claim 1, further comprising updating the utilization.

5. The method of claim 4, further comprising adjusting the portion the plurality of memory devices allocated as available memory and the portion of the plurality of memory devices allocated as spare memory based on the updated utilization.

6. The method of claim 1, further comprising:
   in the event a portion of the available memory of the SSD fails, replacing the failed available memory with a portion of the spare memory.

7. An SSD with an adjustable drive life and capacity, comprising:
   a plurality of memory devices; and
   a memory allocation module configured to:
      determine a desired drive life for the SSD;
      determine a utilization for the SSD, wherein the utilization comprises an average frequency of program/erase (PE) cycles; and
      allocate a portion of the plurality of memory devices as available memory and a portion of the plurality of memory devices as spare memory based on the desired drive life and the utilization.

8. The SSD of claim 7, wherein the desired drive life is configured by a user.

9. The SSD of claim 7, wherein the portion of the plurality of memory devices of the SSD allocated as available memory is greater than or equal to a minimum storage capacity of the SSD, the minimum storage capacity being configured by a user.

10. The SSD of claim 7, wherein the memory allocation module is further configured to update the utilization.

11. The SSD of claim 10, wherein the memory allocation module is further configured to adjust the portion the plurality of memory devices allocated as available memory and the portion of the plurality of memory devices allocated as spare memory based on the updated utilization.

12. The SSD of claim 7 wherein the memory allocation module is further configured to:
   in the event a portion of the available memory of the SSD fails, replacing the failed available memory with a portion of the spare memory.

13. A computer program product comprising a computer readable storage medium containing computer code that, when executed by a computer, implements a method for adjusting a drive life and capacity of a solid state drive (SSD), the SSD comprising a plurality of memory devices, wherein the method comprises:

determining a desired drive life for the SSD;

determining a utilization for the SSD, wherein the utilization comprises an average frequency of program/erase (PE) cycles; and allocating a portion of the plurality of memory devices as available memory and a portion of the plurality of memory devices as spare memory based on the desired drive life and the utilization.

14. The computer program product according to claim 13, wherein the desired drive life is configured by a user.

15. The computer program product according to claim 13, wherein the portion of the plurality of memory devices of the SSD allocated as available memory is greater than or equal to a minimum storage capacity of the SSD, the minimum storage capacity being configured by a user.

16. The computer program product according to claim 13, further comprising updating the utilization.

17. The computer program product according to claim 16, further comprising adjusting the portion the plurality of memory devices allocated as available memory and the portion of the plurality of memory devices allocated as spare memory based on the updated utilization.

* * * * *